US011828907B2

(12) United States Patent
Kim et al.

(10) Patent No.: US 11,828,907 B2
(45) Date of Patent: Nov. 28, 2023

(54) APPARATUS FOR MEASURING PRECIPITATION WITH HIGH ACCURACY AND METHOD FOR CONTROLLING THE SAME

(71) Applicant: National Institute of Meteorological Sciences, Seogwipo-si (KR)

(72) Inventors: Byeong Taek Kim, Seogwipo-si (KR); Young Tae Lee, Seogwipo-si (KR); Sung Eun Hwang, Seogwipo-si (KR); Kyu Young Reno Choi, Seogwipo-si (KR); Ki Hoon Kim, Seogwipo-si (KR)

(73) Assignee: National Institute of Meteorological Sciences, Seogwipo-si (KR)

( * ) Notice: Subject to any disclaimer, the term of this patent is extended or adjusted under 35 U.S.C. 154(b) by 0 days.

(21) Appl. No.: 17/872,898

(22) Filed: Jul. 25, 2022

(65) Prior Publication Data

US 2022/0365244 A1    Nov. 17, 2022

Related U.S. Application Data

(63) Continuation-in-part of application No. 17/672,864, filed on Feb. 16, 2022, now abandoned.

(30) Foreign Application Priority Data

Feb. 16, 2021    (KR) ........................ 10-2021-0020759

(51) Int. Cl.
*G01W 1/14*    (2006.01)
(52) U.S. Cl.
CPC .................................... *G01W 1/14* (2013.01)

(58) Field of Classification Search
CPC . G01W 1/14; G01W 1/10; G01W 1/06; F21V 29/90; G01G 5/00; G06T 2207/30192
See application file for complete search history.

(56) References Cited

U.S. PATENT DOCUMENTS

2014/0290353 A1    10/2014    Shin

FOREIGN PATENT DOCUMENTS

| CN | 109521503 A | 3/2019 |
| JP | 2002228766 A | 8/2002 |

(Continued)

*Primary Examiner* — John Fitzgerald
*Assistant Examiner* — Truong D Phan
(74) *Attorney, Agent, or Firm* — David R. Stevens; Stevens Law Group (57) ABSTRACT

There is provided with a precipitation meter which includes: an upper receiver in which an upper heating unit is embedded to provide heat to an upper surface of the upper receiver to prevent snow from being accumulated thereon, wherein the upper receiver is comprised of a first inner side surface forming inner space for collecting water and a first outer side surface which is an opposite surface of the first inner side surface; a lower receiver with a funnel-shaped part, positioned underneath the upper receiver; a siphon, positioned under the center area of the funnel-shaped part; a tipping bucket unit for receiving the waterdrops from the siphon; a precipitation calculation unit for receiving information on the seesawing movement of the tipping bucket unit and calculating an amount of precipitation by referring to the seesawing movement; and a drainage unit for allowing the waterdrops to be drained out.

5 Claims, 6 Drawing Sheets

(56) References Cited

FOREIGN PATENT DOCUMENTS

| | | | |
|---|---|---|---|
| JP | 2004205406 A | * | 7/2004 |
| JP | 2004205406 A | | 7/2004 |
| KR | 101123238 B1 | | 3/2012 |
| KR | 101264124 B1 | | 5/2013 |

* cited by examiner

FIG. 4

APPARATUS FOR MEASURING PRECIPITATION WITH HIGH ACCURACY AND METHOD FOR CONTROLLING THE SAME

CROSS REFERENCE TO RELATED APPLICATION

This application claims the benefit of earlier filing date of Korean patent application No. 10-2021-0020759, filed on Feb. 16, 2021, the entire contents of which being incorporated herein by reference. Further, this application has U.S. non-provisional patent application Ser. No. 17/672,864, filed on Feb. 16, 2022, as its parent application.

FIELD OF THE DISCLOSURE

The present disclosure relates to an apparatus for measuring precipitation with a high accuracy and a method for controlling the same.

BACKGROUND OF THE DISCLOSURE

A precipitation meter is a device for measuring the amount of precipitation falling to the ground and various types of the precipitation meter, such as cylindrical precipitation meter, siphon-type precipitation meter, tipping-bucket-type precipitation meter, and weighing-type precipitation meter are generally used.

Herein, the precipitation is different from rainfall. In detail, the amount of the precipitation covers measurements of rain, snow, fog, hail, etc. falling from the atmosphere to the ground, while the amount of the rainfall refers to a measurement of rain only falling to the ground.

Among the various types of the precipitation meter, the tipping-bucket-type precipitation meter may measure the amount of the precipitation in solid forms, such as snow and hail, and it has the advantage of being able to digitally record the measurement information with high usability. Especially, the tipping-bucket-type precipitation meter equipped with a heating system is widely used for measuring the precipitation while preventing problems caused by snow being accumulated thereon or water being frozen therein.

Typically, bimetal, i.e., two types of thin metal plates installed inside of the conventional precipitation meter, is used for operating the heating system of the conventional precipitation meter, and more specifically, the heating system is operated by referring to a degree of distortion of the bimetal that is twisted or bent in response to a change in an internal temperature of the conventional precipitation meter.

However, such a conventional precipitation meter using the bimetal for operating the heating system may cause the following problems.

Figure 1A:
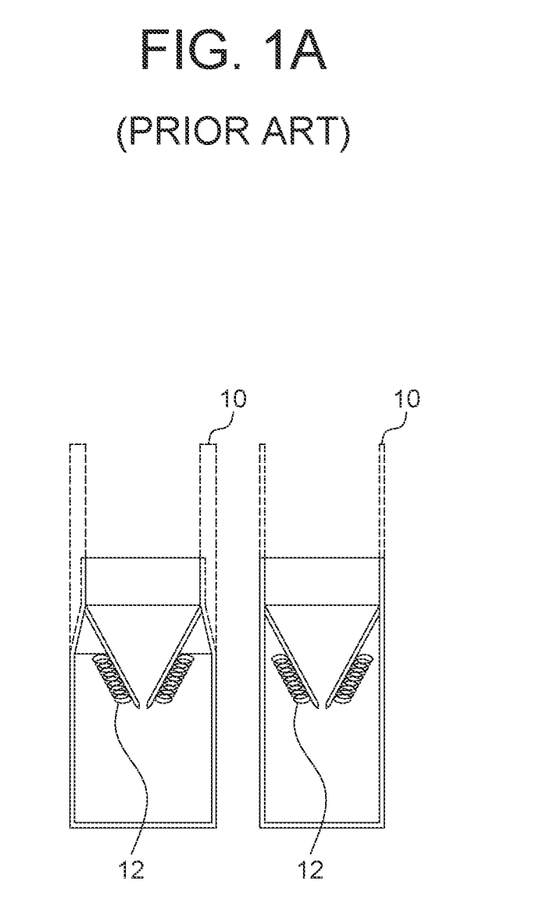
FIGS. 1A and 1B are cross-sectional drawings schematically illustrating conventional precipitation meters.
Figure 1B:
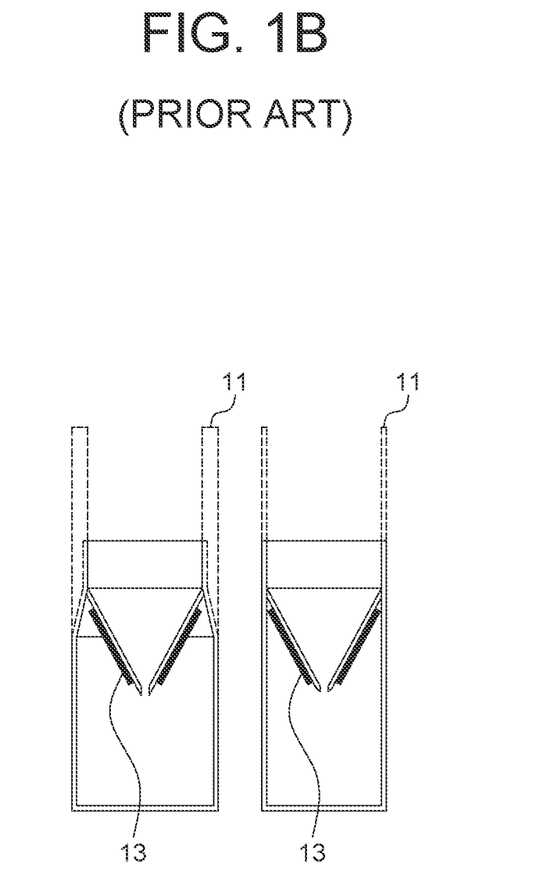

FIGS. 1A and 1B are cross-sectional drawings schematically illustrating the conventional precipitation meters.

By referring to FIGS. 1A and 1B, each of the conventional precipitation meters uses heating coils or heating pads attached to each lower portion of each receiver where the precipitation is collected, thereby melting the snow accumulated inside of the receiver.

FIG. 1A represents the conventional precipitation meter with the heating coils 12 and FIG. 1B represents the conventional precipitation meter with the heating pads 13.

First of all, since each of the conventional precipitation meters equipped with the heating coils 12 or the heating pads 13 is configured to partially heat the lower portion of the funnel-shaped receiver, the accumulation of snow 10 or 11 on an entrance part of the receiver where the heat transfer is relatively weak cannot be prevented. Accordingly, the accuracy of the precipitation measurement becomes low because the precipitation is not sufficiently introduced into each of the conventional precipitation meters. By referring to FIG. 1A and FIG. 1B, the accumulation of snow 10 or 11 is illustrated in dotted lines for easier understanding.

In addition, it is necessary to determine whether to operate the heating system or not by referring to the thermodynamic changes caused in the bimetal installed inside the conventional precipitation meters. However, surface temperatures of the conventional precipitation meters or temperatures of nearby environment thereof cannot be detected immediately due to the accumulation of snow, and thus delays in determining the exact time to operate the heating system may occur.

Furthermore, in case of using the conventional precipitation meter equipped with the heating coils 12, since it is difficult to completely seal space where the heating coils 12 are mounted, malfunction of the heating system may occur due to corrosion of the heating coils 12. Further, combustible dust or fallen leaves collected therein may cause a risk of catching on fire.

Accordingly, there is a need to solve the problems above and improve the heating system equipped therein.

SUMMARY OF THE DISCLOSURE

It is an object of the present disclosure to solve all the aforementioned problems.

It is another object of the present disclosure to provide a method for increasing an accuracy of precipitation by improving a structure of a precipitation meter.

It is still another object of the present disclosure to provide a method for providing an operation algorithm of at least one heating unit in the precipitation meter by referring to a temperature on an upper surface of an upper receiver of the precipitation meter.

It is still yet another object of the present disclosure to provide a method for transferring heat to at least one of a lower receiver and the upper receiver of the precipitation meter.

It is still yet another object of the present disclosure to provide a method for preventing snow from being accumulated on the upper surface of the upper receiver of the precipitation meter.

It is still yet another object of the present disclosure to provide a method for preventing delays in determining the exact time to operate the heating unit by immediately responding to the temperature of the upper surface of the upper receiver or an external temperature near the upper receiver of the precipitation meter.

It is still yet another object of the present disclosure to provide a method for preventing a breakdown of the precipitation meter due to corrosion thereof by providing a completely sealed structure in which the heating unit is enclosed therein.

It is still yet another object of the present disclosure to provide a method for preventing a risk of catching on fire due to combustible dusts or fallen leaves by providing the completely sealed structure in which the heating unit is enclosed therein.

In order to accomplish the objects above, distinctive structures of the present disclosure are described as follows.

In accordance with one aspect of the present disclosure, there is provided a precipitation meter, including an upper receiver in which an upper heating unit is embedded, wherein the upper heating unit is configured to provide heat to an upper surface of the upper receiver to prevent snow from being accumulated on the upper surface of the upper receiver, and wherein the upper receiver is comprised of a first inner side surface forming inner space for collecting water and a first outer side surface which is an opposite surface of the first inner side surface; a lower receiver with a funnel-shaped part, positioned underneath the upper receiver, for receiving the water from the upper receiver and then allowing the water to run towards a center area of the funnel-shaped part; a siphon, positioned under the center area of the funnel-shaped part, for receiving the water from the lower receiver and then allowing one or more waterdrops to be dropped therethrough; a tipping bucket unit for receiving the waterdrops from the siphon, wherein, in response to a weight of the waterdrops collected in the tipping bucket unit being larger than a predetermined weight value, the tipping bucket unit is allowed to perform seesawing movement along a first trajectory and a second trajectory, and wherein the first trajectory and the second trajectory are symmetrical to each other with reference to a virtual line that is perpendicular to a ground where the precipitation meter is laid on and is passing through a center point of the seesawing movement; a precipitation calculation unit for receiving information on the seesawing movement of the tipping bucket unit and calculating an amount of precipitation by referring to one or more pulse signals generated based on the seesawing movement; and a drainage unit for allowing the waterdrops collected in the tipping bucket unit to be drained out; wherein the lower receiver includes an embedded lower heating unit, wherein the lower receiver is comprised of a second inner side surface and a second outer side surface which is an opposite surface of the second inner side surface, wherein the lower heating unit includes at least one lower heating pipe, arranged in a lower sealed space created in between the second inner side surface and the second outer side surface of the lower receiver such that heated antifreeze is delivered through the lower heating pipe to increase or maintain a temperature of the lower receiver; and the precipitation meter further comprising: an antifreeze container, installed at a certain location of the precipitation meter, for providing the antifreeze, wherein the antifreeze container includes a heater for heating the antifreeze and a plurality of antifreeze sensors having at least one antifreeze level sensor and at least one antifreeze temperature sensor for respectively measuring a level and a temperature of the antifreeze contained in the antifreeze container, wherein the heater is located at a bottom of the antifreeze container, and the antifreeze temperature sensor and the antifreeze level sensor are attached to the antifreeze container such that at least one part of the antifreeze temperature sensor and at least one part of the antifreeze level sensor come in contact with the antifreeze inside the antifreeze container, and wherein the antifreeze temperature sensor is either a thermistor or a thermocouple and the antifreeze level sensor is either a capacitive sensor or a magnetic level sensor, a reed switch unit formed beneath the tipping bucket unit, wherein the reed switch unit detects the seesawing movement of the tipping bucket unit and generates the pulse signals based on the seesawing movement to thereby transfer the information on the seesawing movement including the pulse signals to the precipitation calculation unit, and a plurality of contact parts with a ferromagnetic characteristic formed on the tipping bucket unit and the reed switch unit, and wherein the drainage unit is comprised of a first drain and a second drain, wherein the tipping bucket unit is comprised of a first tipping bucket and a second tipping bucket defined by a divider at a center part of the tipping bucket unit, and wherein (i) the first tipping bucket moves along the first trajectory in response to the weight of the waterdrops collected therein being larger than the predetermined weight value, thereby draining out the waterdrops therein through the first drain, and (ii) the second tipping bucket moves along the second trajectory in response to the weight of the waterdrops collected therein being larger than the predetermined weight value, thereby draining out the waterdrops therein through the second drain, and wherein the plurality of contact parts are comprised of a (1_1)-st contact part and a (1_2)-nd contact part respectively formed at an outer bottom surface of the first tipping bucket and an outer bottom surface of the second tipping bucket, and a (2_1)-st contact part and a (2_2)-nd contact part respectively formed on a first oblique surface of the reed switch unit and a second oblique surface of the reed switch unit, and wherein (i) the (1_1)-st contact part and the (2_1)-st contact part make a first contact with each other when the first tipping bucket moves along the first trajectory, and then the (1_1)-st contact part and the (2_1)-st contact part are separated when the first tipping bucket is tilted back in response to the first tipping bucket draining out the waterdrops therein into the first drain and the second tipping bucket collecting the waterdrops from the siphon, and (ii) the (1_2)-nd contact part and the (2_2)-nd contact part make a second contact with each other when the second tipping bucket moves along the second trajectory, and then the (1_2)-nd contact part and the (2_2)-nd contact part are separated when the second tipping bucket is tilted back in response to the second tipping bucket draining out the waterdrops therein into the second drain and the first tipping bucket collecting the waterdrops from the siphon, such that the pulse signals are generated by repetitions of the first contact and the second contact and the amount of precipitation is measured in proportion to a rate of generation of the pulse signals.

As one example, there is provided the precipitation meter wherein the upper heating unit includes at least one upper heating pipe arranged in an upper sealed space created in between the first inner side surface and the first outer side surface of the upper receiver such that the heated antifreeze is delivered through the upper heating pipe to increase or maintain a temperature of the upper receiver.

As another example, the precipitation meter further includes a heating pump for delivering the antifreeze from the antifreeze container, in which the antifreeze is heated therein, to at least one of the upper heating unit and the lower heating unit and delivering the antifreeze, which has been cooled down as a result of being used to increase or maintain the temperature of the upper receiver or the temperature of the lower receiver, back to the antifreeze container.

As another example, the precipitation meter further includes at least one temperature sensor for measuring a temperature of the upper surface of the upper receiver by being embedded in between the first inner side surface of the upper receiver and the upper heating unit, such that the antifreeze in the antifreeze container is heated in response to detecting that the temperature of the upper surface being lower than a first temperature threshold, and such that the antifreeze in the antifreeze container is stopped from being heated in response to detecting that the temperature of the upper surface being higher than a second temperature threshold, and wherein the temperature sensor is either the thermistor or the thermocouple.

As another example, in response to receiving the pulse signals from the reed switch unit, the precipitation calculation unit (i) determines the rate of generation of the pulse signals, (ii) calculates an amount of precipitation per unit time by (ii-1) applying a numeric conversion operation to the rate of generation of the pulse signals, wherein the numeric conversion operation is preset based on a proportional relationship between the rate of generation of the pulse signals and the amount of precipitation, or (ii-2) determining which of a 1-st threshold range to an n-th threshold range the rate of generation of the pulse signals falls into, and thus (iii) transmits information on the amount of precipitation per unit time to at least one display disposed on a visible surface of the precipitation meter or to a separate device.

BRIEF DESCRIPTION OF THE DRAWINGS

The above and other objects and features of the present disclosure will become apparent from the following description of preferred embodiments given in conjunction with the accompanying drawings. The accompanying drawings used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

In the following detailed description, reference is made to the accompanying drawings that show, by way of illustration, specific embodiments in which the invention may be practiced. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Furthermore, the present invention includes all possible combinations of embodiments indicated in the present disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to the present disclosure to be carried out easily, the example embodiments of the present disclosure by referring to attached diagrams will be explained in detail as shown below.

Figure 2:
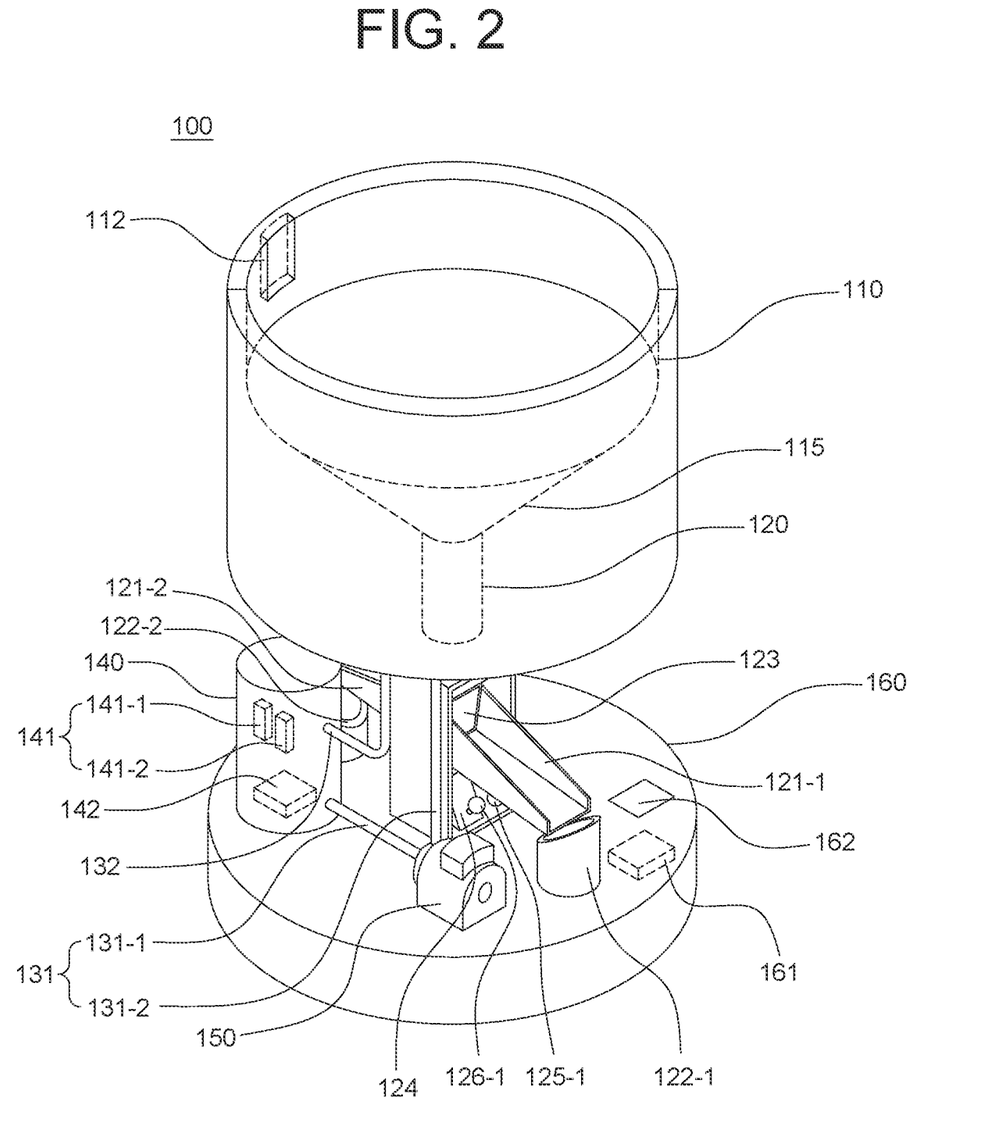
FIG. 2 is a drawing schematically illustrating a structure of a precipitation meter with a high accuracy in accordance with one example embodiment of the present disclosure.

FIG. 2 is a drawing schematically illustrating a structure of a precipitation meter with a high accuracy in accordance with one example embodiment of the present disclosure.

By referring to FIG. 2, in accordance with one example embodiment of the present invention, the precipitation meter 100 includes an upper receiver 110, a lower receiver 115, a siphon 120, a tipping bucket unit, a precipitation calculation unit 161, and a drainage unit. Herein, the tipping bucket unit and the drainage unit are illustrated in a way that the tipping bucket unit is comprised of two tipping buckets 121-1, 121-2 and the drainage unit is comprised of two drains 122-1, 122-2 respectively. However, the present disclosure is not limited thereto and more details regarding the configurations of the tipping bucket unit and the drainage unit will be described below. Since the tipping bucket unit is comprised of the two tipping buckets 121-1, 121-2 and the drainage unit is comprised of the two drains 122-1, 122-2, it is diagrammatically difficult to annotate the tipping bucket unit and the draining unit with single numberings (e.g., 121 and 122 respectively). Therefore, each of the two tipping buckets 121-1, 121-2 and each of the two drains 122-1, 122-2 are separately annotated for explicit indications of each part of the tipping bucket unit and the drainage unit in the drawings, and also for more precise explanations of operations of each part in the subsequent description.

Herein, the upper receiver 110 may be formed in a shape of entrance so that water can be collected into the precipitation meter 100.

Also, the lower receiver 115 may include a funnel-shaped part, positioned underneath the upper receiver 110, for receiving the water from the upper receiver 110 and then allow the water to run towards a center area of the funnel-shaped part. Herein, the siphon 120 may be positioned under the center area of the funnel-shaped part for receiving the water from the lower receiver 115 and then allowing one or more waterdrops to be dropped therethrough.

Herein, the siphon 120 may be configured as a tube with a hollow inner space and positioned at the center area of the funnel-shaped part so that the water is dropped down from the lower receiver 115 at a certain speed. Also, stainless steel net may be engaged with the tube such that any dust or fallen leaves are filtered out from the water.

Next, the tipping bucket unit may be comprised of at least two spaces for receiving the waterdrops from the siphon 120. Herein, in response to a weight of the waterdrops collected in the tipping bucket unit being larger than a predetermined weight value, the tipping bucket unit is allowed to perform seesawing movement along a first trajectory and a second trajectory. Herein, the first trajectory and the second trajectory are symmetrical to each other with reference to a virtual line that is perpendicular to a ground where the precipitation meter is laid on and is passing through a center point of the seesawing movement. And, the precipitation meter 100 may allow the precipitation calculation unit 161 to receive information on the seesawing movement of the tipping bucket unit and to calculate an amount of the precipitation by referring to one or more pulse signals generated based on the seesawing movement. Herein, the precipitation meter 100 may allow the drainage unit to allow the waterdrops collected in the tipping bucket unit to be drained out as the seesawing movement is performed.

For reference, there is no limitation on a position at which the precipitation calculation unit 161 is mounted, and the precipitation calculation unit 161 may further include or interwork with a reed switch unit 124 designed to generate one or more pulse signals while the tipping bucket unit performs the seesawing movement. For example, FIG. 2 of the present disclosure illustrates the precipitation calculation unit 161 to be located inside a support 160 of the precipitation meter 100, and thus its corresponding structure is indicated with dotted lines, but the present disclosure is not limited thereto.

Herein, the reed switch unit 124 may be formed beneath the tipping bucket unit. As a result, the reed switch unit 124 may detect the seesawing movement of the tipping bucket unit and generate the pulse signals based on the seesawing movement to thereby transfer the information on the seesawing movement including the pulse signals to the precipitation calculation unit 161.

For example, the precipitation meter 100 may further include a plurality of contact parts with a ferromagnetic characteristic that are formed on the tipping bucket unit and the reed switch unit 124.

In specific embodiments, the tipping bucket unit is comprised of the first tipping bucket 121-1 and the second tipping bucket 121-2 defined by a divider 123 at a center part of the tipping bucket unit. Herein, the first tipping bucket 121-1 moves along the first trajectory in response to the weight of the waterdrops collected therein being larger than the predetermined weight value, thereby draining out the waterdrops therein through the first drain 122-1. And the second tipping bucket 121-2 moves along the second trajectory in response to the weight of the waterdrops collected therein being larger than the predetermined weight value, thereby draining out the waterdrops therein through the second drain 122-2.

For example, the tipping bucket unit may be mechanically structured such that the first tipping bucket 121-1 or the second tipping bucket 121-2 respectively move along the first trajectory or the second trajectory when two-thirds of their respective buckets are filled with the waterdrops. On the other hand, it may also be possible to mechanically devise the tipping bucket unit such that the first tipping bucket 121-1 or the second tipping bucket 121-2 respectively move along the first trajectory or the second trajectory when three-quarters of their respective buckets are filled with the waterdrops.

Referring to FIG. 2, the precipitation meter 100 may further include a heating pipe inlet 131, a heating pipe outlet 132, an antifreeze container 140, and a heating pump 150. Herein, the heating pipe inlet connecting the antifreeze container 140 and the heating pump 150 is labeled as 131-1, and the heating pipe inlet connecting at least one of the upper receiver 110 and the lower receiver 115 to the heating pump 150 is labeled as 131-2.

Figure 3:
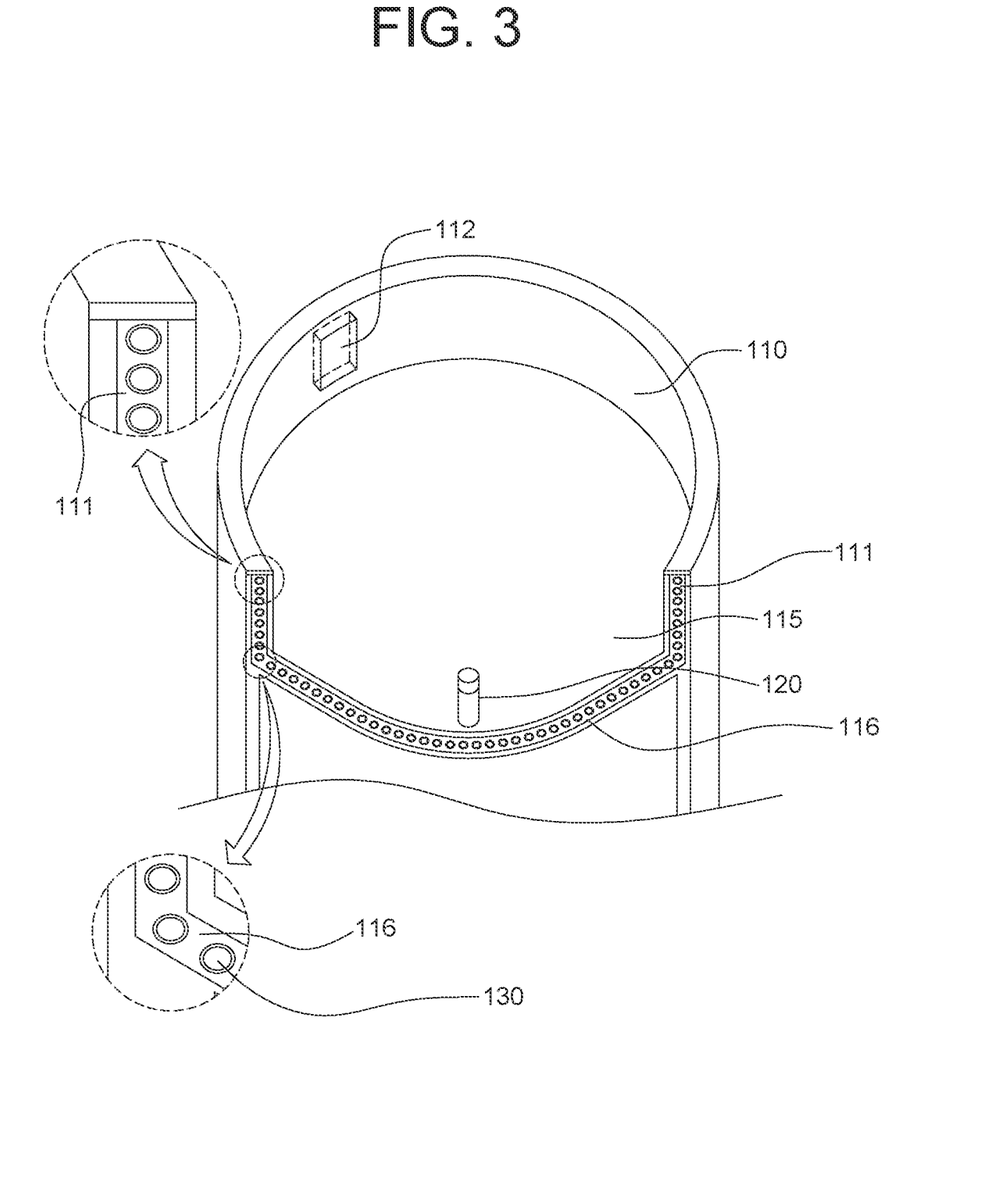
FIG. 3 is a cross-sectional drawing schematically illustrating the structure of the precipitation meter with a high accuracy in accordance with one example embodiment of the present disclosure.

FIG. 3 is a cross-sectional drawing schematically illustrating the structure of the precipitation meter 100 in accordance with one example embodiment of the present disclosure.

Referring to FIG. 3, the precipitation meter 100 may be comprised of the upper receiver 110 and the lower receiver 115 in which the upper heating unit 111 and the lower heating unit 116 are embedded therein respectively. Also, the upper heating unit 111 and the lower heating unit 116 may include at least one heating pipe 130. Herein, the heating pipe 130 may wind its way in the upper receiver 110 and the lower receiver 115, but the present disclosure is not limited thereto, and various locations, sizes of the diameter, installed patterns of the heating pipe 130 may be considered.

More specifically, the upper receiver 110 may be comprised of a first inner side surface forming inner space for collecting water and a first outer side surface which is an opposite surface of the first inner side surface. And the upper heating unit 111 may be embedded in the sealed inner space, formed by the first inner side surface and the first outer side surface, for providing heat to an upper surface of the upper receiver 110 to prevent snow from being accumulated on the upper surface of the upper receiver 110.

For example, the upper heating unit 111 may be positioned in the sealed inner space between the first inner side surface and the first outer side surface of the upper receiver 110 and further include the upper heating pipe 130 arranged to affect the whole surface of the upper receiver 110.

Herein, the heating pipe 130 is illustrated as an integrated pipe capable of affecting both the upper receiver 110 and the lower receiver 115, but the heating pipe 130 is not limited thereto and various modifications may be applied. For example, the heating pipe 130 may include at least one upper heating pipe and at least one lower heating pipe respectively included in the upper heating unit 111 and the lower heating unit 116.

Also, the lower receiver 115 may be comprised of a second inner side surface forming inner space for collecting water and a second outer side surface which is an opposite surface of the second inner side surface, and the lower heating unit 116 may include at least one lower heating pipe, arranged in a lower sealed space created in between the second inner side surface and the second outer side surface of the lower receiver 115, such that the heated antifreeze is delivered through the lower heating pipe to increase or maintain a temperature of the lower receiver 115.

Figure 4:
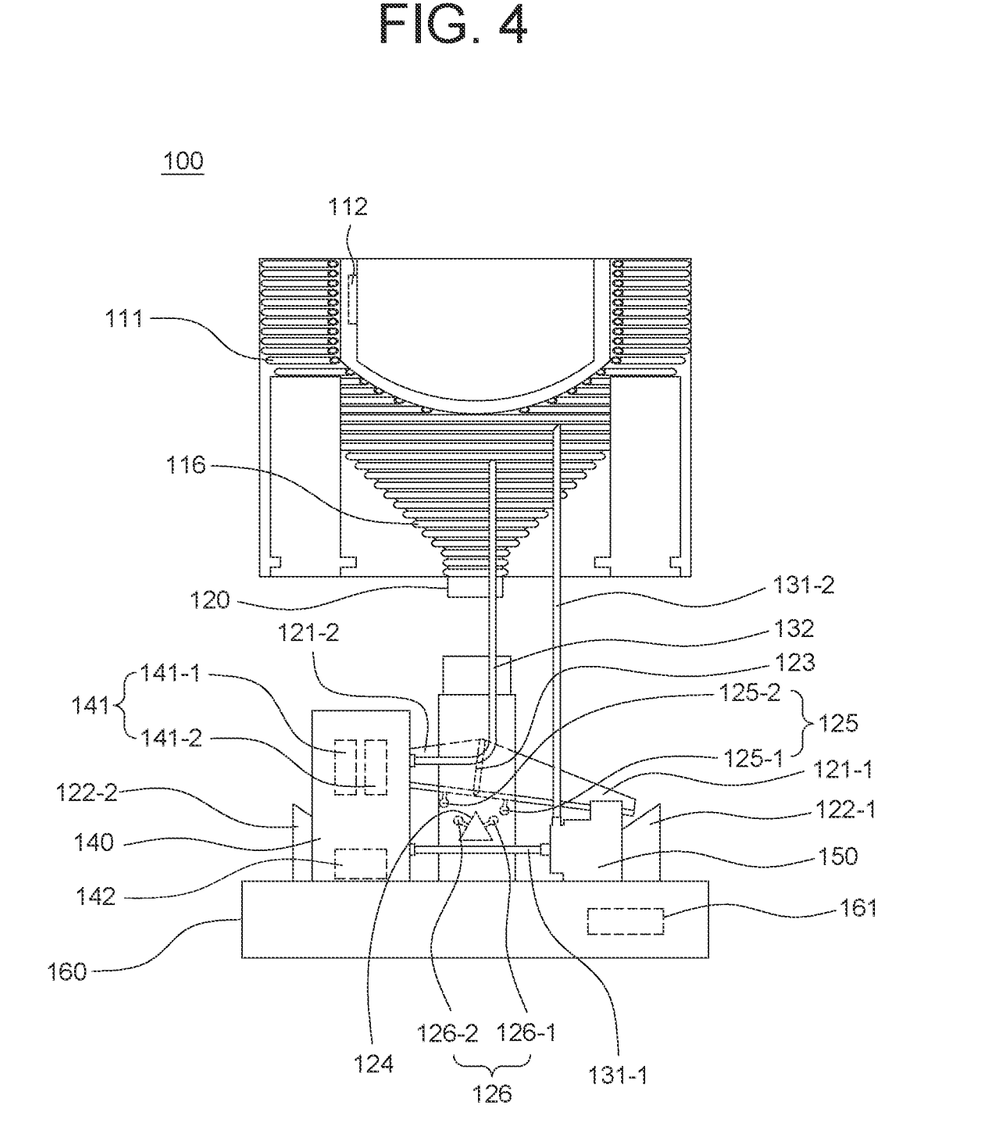
FIG. 4 is a drawing illustrating the structure of the precipitation meter with a high accuracy with details in accordance with one example embodiment of the present disclosure.

FIG. 4 is a drawing illustrating an internal structure of the precipitation meter 100 in accordance with one example embodiment of the present disclosure.

Referring to FIG. 4, the precipitation meter 100 may include the plurality of contact parts 125, 126, the heating pipe inlet 131, the heating pipe outlet 132, the antifreeze container 140, and the heating pump 150.

For reference, FIG. 4 schematically illustrates a cross-section acquired by cutting through a part of the upper receiver 110 and a part of the lower receiver 115 while the first outer side surface and the second outer side surface of the upper receiver 110 are omitted from the illustration, in order to provide an exemplary embodiment of the internal structure of the precipitation meter 100 for easier understanding.

By referring to FIG. 4, the plurality of contact parts may be comprised of a (1_1)-st contact part 125-1 and a (1_2)-nd contact part 125-2 respectively formed at an outer bottom surface of the first tipping bucket 121-1 and an outer bottom surface of the second tipping bucket 121-2, and a (2_1)-st contact part 126-1 and a (2_2)-nd contact part 126-2 respectively formed on a first oblique surface of the reed switch unit 124 and a second oblique surface of the reed switch unit 124.

Herein, the (1_1)-st contact part 125-1 and the (2_1)-st contact part 126-1 may make a first contact with each other when the first tipping bucket 121-1 moves along the first trajectory, and subsequently, the (1_1)-st contact part 125-1 and the (2_1)-st contact part 126-1 may be separated when the first tipping bucket 121-1 is tilted back in response to the first tipping bucket 121-1 draining out the waterdrops therein into the first drain 122-1 and the second tipping bucket 121-2 collecting the waterdrops from the siphon 120. Also, the (1_2)-nd contact part 125-2 and the (2_2)-nd contact part 126-2 may make a second contact with each other when the second tipping bucket 121-2 moves along the second trajectory, and afterwards, the (1_2)-nd contact part 125-2 and the (2_2)-nd contact part 126-2 may be separated when the second tipping bucket 121-2 is tilted back in response to the second tipping bucket 121-2 draining out the waterdrops therein into the second drain 122-2 and the first tipping bucket 121-1 collecting the waterdrops from the siphon 120. As a result, the pulse signals may be generated by repetitions of the first contact and the second contact and the amount of precipitation is measured in proportion to a rate of generation of the pulse signals.

For example, when the first tipping bucket 121-1 is tilted towards the first drain 122-1 to a certain degree as a result of the weight of the waterdrops collected therein being larger than the predetermined weight value, the magnetic field formed by the contact parts due to their ferromagnetic characteristic may further provide an attractive force between the (1_1)-st contact part 125-1 and the (2_1)-st contact part 126-1 of the reed switch unit 124 to induce a direct contact between them. Afterwards, when the waterdrops collected in the first tipping bucket 121-1 are emptied into the first drain and the second tipping bucket 121-2 collects the waterdrops from the siphon which exert the torque moment against the first trajectory, the second tipping bucket 121-2 is tilted towards the second drain 122-2 and the (1_1)-st contact part 125-1 and the (2_1)-st contact part 126-1 are separated due to the force exerted on the second tipping bucket 121-2. The first contact and the second contact repeatedly occur as a result of such movement, and a pair of the first contact and the second contact may be converted into a single pulse signal, but the present disclosure is not limited thereto and does not exclude a case where multiple occurrences of the first contact and multiple occurrences of the second contact are converted into the single pulse signal. Herein, a larger amount of precipitation may result in more frequent pulse signals generated per unit time.

Consequently, in response to receiving the pulse signals from the reed switch unit 124, the precipitation calculation unit 161 may (i) determine the rate of generation of the pulse signals, (ii) calculate an amount of precipitation per unit time by (ii-1) applying a numeric conversion operation to the rate of generation of the pulse signals, or (ii-2) determining which of a 1-st threshold range to an n-th threshold range the rate of generation of the pulse signals falls into, and thus (iii) transmit information on the amount of precipitation per unit time to at least one display 162 disposed on a visible surface of the precipitation meter 100 or to a separate device.

Herein, the numeric conversion operation may be predetermined based on a proportional relationship between the rate of generation of the pulse signals and the amount of precipitation.

On the other hand, if the amount of precipitation per unit time is determined based on threshold ranges of the rate of generation of the pulse signals, the 1-st threshold range to the n-th threshold range may be preset in the precipitation calculation unit 161 (for example, 6 pulse signals generated per min to 10 pulse signals generated per min may be set as a 1-st threshold range that corresponds to a 1-st value of the amount of precipitation per unit time, 11 pulse signals generated per min to 15 pulse signals generated per min may be set as a 2-nd threshold range that corresponds to 2-nd value of the amount of precipitation per unit time, and so on). Then, in response to receiving the pulse signals from the reed switch unit 124 and determining the rate of generation of the pulse signals, the precipitation calculation unit 161 may determine which of the 1-st threshold range to the n-th threshold range the rate of generation of the pulse signals falls into, to thereby decide the amount of precipitation per unit time.

By referring to FIG. 4, the heating pipe inlet 131 may serve as an entrance hallway for transferring the antifreeze to at least one of the upper receiver 110 and the lower receiver 115. And the heating pipe outlet 132 may serve as an exit hallway for transferring the antifreeze back to the antifreeze container 140 after being used for increasing or maintaining the temperature of at least one of the upper receiver 110 and the lower receiver 115. In FIG. 4, the heating pipe inlet 131 is illustrated as being connected to the lower heating unit 116 for transferring the antifreeze from the heating pump 150 to the lower receiver 115, but the present disclosure is not limited thereto. Also, in FIG. 4, the heating pipe outlet 132 is illustrated in a way that the heating pipe outlet 132 is connected to the lower heating unit 116 for transferring the antifreeze from the lower receiver 115 to the antifreeze container 140, but the present disclosure is not limited thereto.

Herein, the antifreeze container 140 that stores the antifreeze may be located at a certain location for providing the antifreeze through the heating pipe inlet 131 and receiving the antifreeze through the heating pipe outlet 132. But the location of the antifreeze container 140 is not limited to the illustration in FIG. 4. Also, the antifreeze container 140 may include a heater 142 for heating the antifreeze, and a plurality of antifreeze sensors 141 having at least one antifreeze temperature sensor 141-1 and at least one antifreeze level sensor 141-2 for respectively measuring a temperature and a level of the antifreeze contained in the antifreeze container.

Herein, the heater 142 may be located at a bottom of the antifreeze container to take advantage of convection current during heating the antifreeze in the antifreeze container 140.

Further, the antifreeze temperature sensor 141-1 and the antifreeze level sensor 141-2 may be attached to the antifreeze container 140 such that at least one part of the antifreeze temperature sensor 141-1 and at least one part of the antifreeze level sensor 141-2 come in contact with the antifreeze inside the antifreeze container 140. Herein, the antifreeze temperature sensor 141-1 may be either a thermistor or a thermocouple and the antifreeze level sensor 141-2 may be either a capacitive sensor or a magnetic level sensor.

When the capacitive sensor is used as the antifreeze level sensor 141-2, one end of the antifreeze level sensor 141-2 may be attached to an inner top surface of the antifreeze container 140 and the other end of the antifreeze level sensor 141-2 may be dipped into the antifreeze inside the antifreeze container 140 to measure the level of the antifreeze.

On the other hand, if the magnetic level sensor is used as the antifreeze level sensor 141-2, a magnetic float of the antifreeze level sensor 141-2 may be made to float on the antifreeze inside the antifreeze container 140 and the magnetic float may work in conjunction with a magnetic level gauge of the antifreeze level sensor 141-2 attached to the side of the antifreeze container 140 to indicate the level of the antifreeze. Further explanation on how the antifreeze level sensor 141-2 works is omitted since operating principles of the capacitive sensor and the magnetic level sensor are conventionally known.

Also, the heating pump 150 may deliver the heated antifreeze from the antifreeze container 140 to at least one of the upper heating unit 111 and the lower heating unit 116. However, the location where the heating pump 150 is being mounted is not limited to the illustration in FIG. 4 and the heating pump 150 may be mounted in any location where the heating pump 150 can be connected to at least part of the heating pipe inlet 131 for delivering the heated antifreeze.

Specifically, the heated antifreeze may be delivered to at least one of the upper heating unit 111 and the lower heating unit 116 through the heating pipe inlet 131 by the heating pump 150.

The heating pump 150 may deliver the antifreeze, which has been cooled down as a result of being used to increase or maintain the temperature of the upper receiver 110 or the temperature of the lower receiver 115, back to the antifreeze container 140 through the heating pipe outlet 132.

The precipitation meter 100 may further include at least one temperature sensor 112, embedded in between the first inner side surface of the upper receiver 110 and the upper heating unit 111, for measuring a temperature of the upper surface of the upper receiver 110, such that the antifreeze in the antifreeze container 140 is heated in response to detecting that the temperature of the upper surface being lower than a first temperature threshold and such that the antifreeze in the antifreeze container 140 is stopped from being heated in response to detecting that the temperature of the upper surface being higher than a second temperature threshold. Herein, the temperature sensor 112 may be either the thermistor or the thermocouple.

Hereafter, a method for controlling the precipitation meter 100 with a high accuracy in accordance with the present disclosure will be described.

Figure 5:
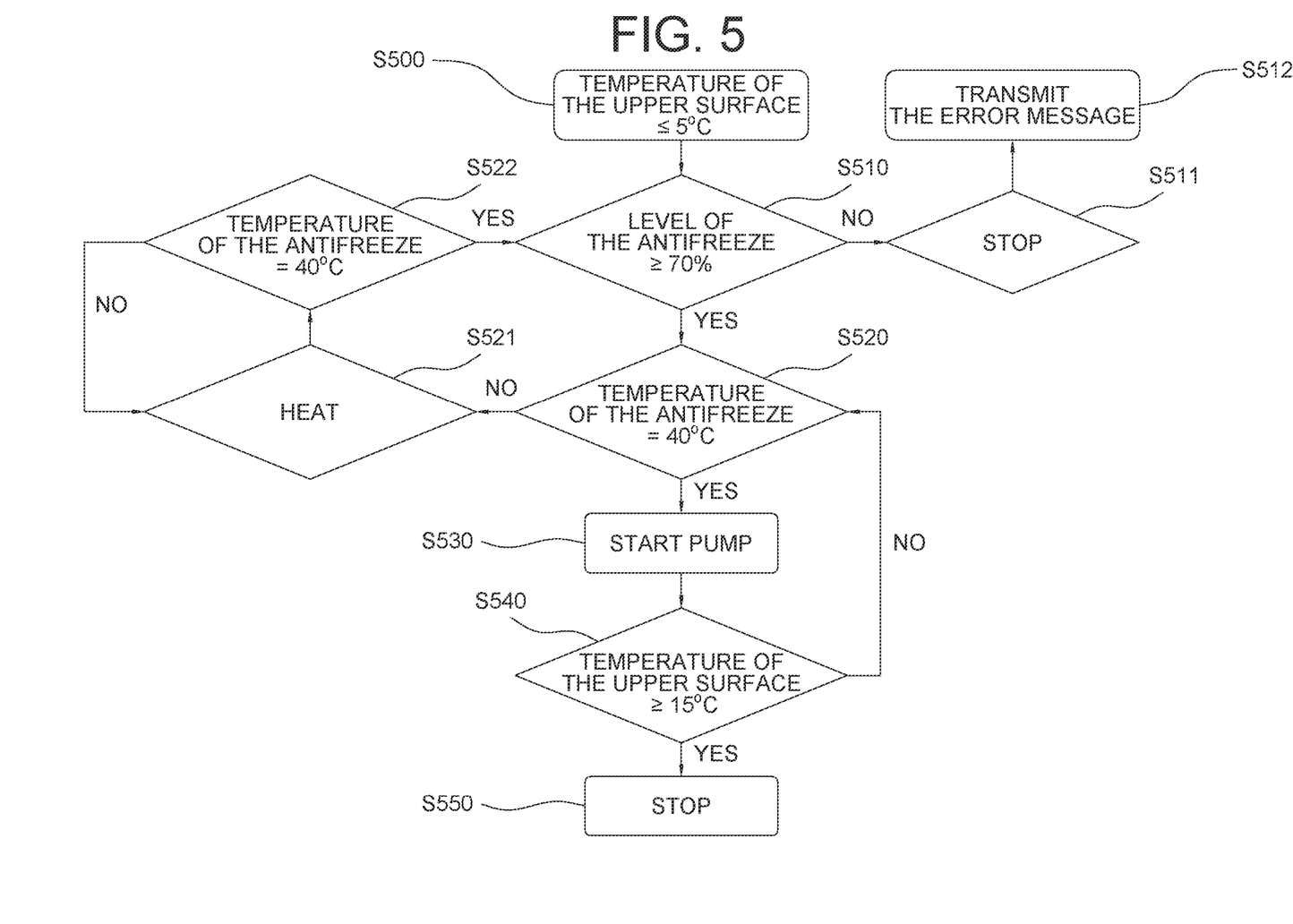
FIG. 5 is a drawing illustrating an algorithm for controlling the precipitation meter with a high accuracy in accordance with another example embodiment of the present disclosure.

FIG. 5 is a drawing illustrating an algorithm for controlling the precipitation meter 100 with a high accuracy in accordance with another example embodiment of the present disclosure.

Referring to FIG. 5, in response to detecting the temperature of the upper surface being lower than the first temperature threshold, the precipitation meter 100 may start operating the heating system embedded in the precipitation meter 100 at a step of S500.

Herein, the upper surface of the upper receiver 110 is located near the entrance of the upper receiver 110 where the water is introduced. Herein, the first temperature threshold may have been predetermined as 5° C., but the present disclosure is not limited thereto.

In response to detecting the temperature of the upper surface being higher than the second temperature threshold, the precipitation meter 100 may stop the heating system at a step of S550.

Herein, the second temperature threshold is higher than the first temperature threshold and lower than a third temperature threshold and the second temperature threshold may have been predetermined as 15° C., but the present disclosure is not limited thereto and more details will be described below.

In specific, in response to detecting the temperature of the upper surface being lower than the first temperature threshold, the precipitation meter 100 allows at least one antifreeze level sensor 141-2 in the antifreeze container 140 to measure a level of the antifreeze therein at a step of S510.

In response to detecting the level of the antifreeze being lower than a predetermined level value, the precipitation meter 100 may stop the heating system at a step of S511 and allow at least one error message to be transferred to at least one user through at least one of a display 162 thereof or a separate device at a step of S512.

Herein, the predetermined level value may have been predetermined as 70%, but the present disclosure is not limited thereto.

In response to detecting the level of the antifreeze being higher than the predetermined level value, the precipitation meter 100 allows at least one antifreeze temperature sensor 141-1 in the antifreeze container 140 to measure the temperature of the antifreeze therein at a step of S520.

In response to detecting the temperature of the antifreeze being lower than the third temperature threshold, the precipitation meter 100 allows the heater 142 to heat the antifreeze in the antifreeze container 140, such that the temperature of the antifreeze increases up to the third temperature threshold at a step of S521.

Herein, the third temperature threshold is higher than the first temperature threshold and the third temperature threshold may have been predetermined as 40° C., but the present disclosure is not limited thereto.

In response to detecting the temperature of the antifreeze being same as the third temperature threshold at a step of S522, the precipitation meter 100 allows the antifreeze level sensor 141-2 to repeat measuring the level of the antifreeze in the antifreeze container 140 at the step of S510.

In response to detecting the level of the antifreeze being higher than the predetermined level value at the step of S510, the precipitation meter 100 proceeds to the step of S520. In response to detecting the temperature of the antifreeze being same as the third temperature threshold, the precipitation meter 100 allows the heating pump 150 to deliver the antifreeze to at least one of the upper receiver 110 and the lower receiver 115 at the step of S530.

Specifically, at the step of S530, the heated antifreeze may be delivered to at least one of the upper heating unit 111 and the lower heating unit 116 through the heating pipe inlet 131 by the heating pump 150. Next, the precipitation meter 100 measures the temperature of the upper surface of the upper receiver 110 at the step of S540. In response to detecting the temperature of the upper surface being lower than the second temperature threshold, the precipitation meter 100 repeat measuring the temperature of the antifreeze by proceeding to the step of S520.

Herein, the second temperature threshold is higher than the first temperature threshold and lower than the third temperature threshold.

Meanwhile, in response to detecting the temperature of the upper surface being higher than the second temperature threshold at the step of S540, the precipitation meter 100 allows the heating pump 150 to stop delivering the antifreeze to at least one of the upper receiver 110 and the lower receiver 115.

The present disclosure has an effect of increasing an accuracy of precipitation by improving a structure of a precipitation meter.

The present disclosure has another effect of providing an operation algorithm of at least one heating unit in the precipitation meter by referring to a temperature on an upper surface of an upper receiver of the precipitation meter.

The present disclosure has still another effect of transferring heat to at least one of a lower receiver and the upper receiver of the precipitation meter.

The present disclosure has still yet another effect of preventing snow from being accumulated on the upper surface of the upper receiver of the precipitation meter.

The present disclosure has still yet another effect of preventing delays in determining the exact time to operate the heating unit by immediately responding to the temperature of the upper surface or an external temperature near the upper receiver of the precipitation meter.

The present disclosure has still yet another effect of preventing a breakdown of the precipitation meter due to corrosion thereof by providing a completely sealed structure in which the heating unit is enclosed therein.

The present disclosure has still yet another effect of preventing a risk of catching on fire due to combustible dusts or fallen leaves by providing the completely sealed structure in which the heating unit is enclosed therein.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A precipitation meter, comprising:

An upper receiver in which an upper heating unit is embedded, wherein the upper heating unit is configured to provide heat to an upper surface of the upper receiver to prevent snow from being accumulated on the upper surface of the upper receiver, and wherein the upper receiver is comprised of a first inner side surface forming inner space for collecting water and a first outer side surface which is an opposite surface of the first inner side surface;

a lower receiver with a funnel-shaped part, positioned underneath the upper receiver, for receiving the water from the upper receiver and then allowing the water to run towards a center area of the funnel-shaped part;

a siphon, positioned under the center area of the funnel-shaped part, for receiving the water from the lower receiver and then allowing one or more waterdrops to be dropped therethrough;

a tipping bucket unit for receiving the waterdrops from the siphon, wherein, in response to a weight of the waterdrops collected in the tipping bucket unit being larger than a predetermined weight value, the tipping bucket unit is allowed to perform seesawing movement along a first trajectory and a second trajectory, and wherein the first trajectory and the second trajectory are symmetrical to each other with reference to a virtual line that is perpendicular to a ground where the precipitation meter is laid on and is passing through a center point of the seesawing movement;

a precipitation calculation unit for receiving information on the seesawing movement of the tipping bucket unit and calculating an amount of precipitation by referring to at one or more pulse signals generated based on the seesawing movement; and a drainage unit for allowing the waterdrops collected in the tipping bucket unit to be drained out;

wherein the lower receiver includes an embedded lower heating unit, wherein the lower receiver is comprised of a second inner side surface and a second outer side surface which is an opposite surface of the second inner side surface, wherein the lower heating unit includes at least one lower heating pipe, arranged in a lower sealed space created in between the second inner side surface and the second outer side surface of the lower receiver such that heated antifreeze is delivered through the lower heating pipe to increase or maintain a temperature of the lower receiver; and the precipitation meter further comprising:

an antifreeze container, installed at a certain location of the precipitation meter, for providing the antifreeze, wherein the antifreeze container includes a heater for heating the antifreeze and a plurality of antifreeze sensors having at least one antifreeze level sensor and at least one antifreeze temperature sensor for respectively measuring a level and a temperature of the antifreeze contained in the antifreeze container, wherein the heater is located at a bottom of the antifreeze container, and the antifreeze temperature sensor and the antifreeze level sensor are attached to the antifreeze container such that at least one part of the antifreeze temperature sensor and at least one part of the antifreeze level sensor come in contact with the antifreeze inside the antifreeze container, and wherein the antifreeze temperature sensor is either a thermistor or a thermocouple and the antifreeze level sensor is either a capacitive sensor or a magnetic level sensor, a reed switch unit formed beneath the tipping bucket unit, wherein the reed switch unit detects the seesawing movement of the tipping bucket unit and generates the pulse signals based on the seesawing movement to thereby transfer the information on the seesawing movement including the pulse signals to the precipitation calculation unit, and a plurality of contact parts with a ferromagnetic characteristic formed on the tipping bucket unit and the reed switch unit, and wherein the drainage unit is comprised of a first drain and a second drain, wherein the tipping bucket unit is comprised of a first tipping bucket and a second tipping bucket defined by a divider at a center part of the tipping bucket unit, and wherein (i) the first tipping bucket moves along the first trajectory in response to the weight of the waterdrops collected therein being larger than the predetermined weight value, thereby draining out the waterdrops therein through the first drain, and (ii) the second tipping bucket moves along the second trajectory in response to the weight of the waterdrops collected therein being larger than the predetermined weight value, thereby draining out the waterdrops therein through the second drain, and wherein the plurality of contact parts are comprised of a (1_1)-st contact part and a (1_2)-nd contact part respectively formed at an outer bottom surface of the first tipping bucket and an outer bottom surface of the second tipping bucket, and a (2_1)-st contact part and a (2_2)-nd contact part respectively formed on a first oblique surface of the reed switch unit and a second oblique surface of the reed switch unit, and wherein (i)

the (1_1)-st contact part and the (2_1)-st contact part make a first contact with each other when the first tipping bucket moves along the first trajectory, and then the (1_1)-st contact part and the (2_1)-st contact part are separated when the first tipping bucket is tilted back in response to the first tipping bucket draining out the waterdrops therein into the first drain and the second tipping bucket collecting the waterdrops from the siphon, and (ii) the (1_2)-nd contact part and the (2_2)-nd contact part make a second contact with each other when the second tipping bucket moves along the second trajectory, and then the (1_2)-nd contact part and the (2_2)-nd contact part are separated when the second tipping bucket is tilted back in response to the second tipping bucket draining out the waterdrops therein into the second drain and the first tipping bucket collecting the waterdrops from the siphon, such that the pulse signals are generated by repetitions of the first contact and the second contact and the amount of precipitation is measured in proportion to a rate of generation of the pulse signals.

2. The precipitation meter of claim 1, wherein the upper heating unit includes at least one upper heating pipe arranged in an upper sealed space created in between the first inner side surface and the first outer side surface of the upper receiver such that the heated antifreeze is delivered through the upper heating pipe to increase or maintain a temperature of the upper receiver.

3. The precipitation meter of claim 1, further comprising:
a heating pump for delivering the antifreeze from the antifreeze container, in which the antifreeze is heated therein, to at least one of the upper heating unit and the lower heating unit and delivering the antifreeze, which has been cooled down as a result of being used to increase or maintain the temperature of the upper receiver or the temperature of the lower receiver, back to the antifreeze container.

4. The precipitation meter of claim 1, further comprising:
at least one temperature sensor for measuring a temperature of the upper surface of the upper receiver by being embedded in between the first inner side surface of the upper receiver and the upper heating unit, such that the antifreeze in the antifreeze container is heated in response to detecting that the temperature of the upper surface being lower than a first temperature threshold, and such that the antifreeze in the antifreeze container is stopped from being heated in response to detecting that the temperature of the upper surface being higher than a second temperature threshold, and wherein the temperature sensor is either the thermistor or the thermocouple.

5. The precipitation meter of claim 1, wherein, in response to receiving the pulse signals from the reed switch unit, the precipitation calculation unit (i) determines the rate of generation of the pulse signals, (ii) calculates an amount of precipitation per unit time by (ii-1) applying a numeric conversion operation to the rate of generation of the pulse signals, wherein the numeric conversion operation is preset based on a proportional relationship between the rate of generation of the pulse signals and the amount of precipitation, or (ii-2) determining which of a 1-st threshold range to an n-th threshold range the rate of generation of the pulse signals falls into, and thus (iii) transmits information on the amount of precipitation per unit time to at least one display disposed on a visible surface of the precipitation meter or to a separate device.

* * * * *